(12) United States Patent
Koh et al.

(10) Patent No.: US 8,262,092 B2
(45) Date of Patent: Sep. 11, 2012

(54) COMPOSITION FOR GASKET AND GASKET

(75) Inventors: Young Deog Koh, Seoul (KR); Kyung Chan Woo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 265 days.

(21) Appl. No.: 12/385,412

(22) Filed: Apr. 7, 2009

(65) Prior Publication Data

US 2009/0283973 A1 Nov. 19, 2009

(30) Foreign Application Priority Data

May 19, 2008 (KR) .................. 10-2008-0046183

(51) Int. Cl.
*F16J 15/00* (2006.01)
*C08L 53/00* (2006.01)

(52) U.S. Cl. .............. 277/504; 524/505; D32/6; D32/29

(58) Field of Classification Search .................. 277/504; 524/505; D32/6, 29
See application file for complete search history.

(56) References Cited

U.S. PATENT DOCUMENTS

| 6,824,730 B2 * | 11/2004 | Mashita et al. ............ 264/480 |
| 2002/0147274 A1 * | 10/2002 | Sasagawa et al. ............ 525/98 |

FOREIGN PATENT DOCUMENTS

| EP | 0 372 549 A2 | 6/1990 |
| EP | 0 845 498 A1 | 6/1998 |
| EP | 1 031 608 A2 | 8/2000 |
| EP | 1 564 247 A1 | 8/2005 |
| JP | 2001-302874 | 10/2001 |
| KR | 2006-50779 | * 9/2005 |
| WO | 95/27756 | 10/1995 |

OTHER PUBLICATIONS

European Search Report issued Apr. 9, 2009 in corresponding European Patent Application 09152900.8.

* cited by examiner

*Primary Examiner* — Robert D. Harlan
(74) *Attorney, Agent, or Firm* — Staas & Halsey LLP

(57) ABSTRACT

Disclosed herein is a composition for a gasket, including about 100 parts by weight of a hydrogenated styrene-based block copolymer, about 70 to 99 parts by weight of a petroleum-based softener, about 10 to 25 parts by weight of a polyolefin-based resin; about 10 to 25 parts by weight of an inorganic filler, and about 10 to 25 parts by weight of a heat-resistant polymer, based on 100 parts by weight of the hydrogenated styrene-based block copolymer. The thermoplastic elastomer composition has superior physical properties, such as tensile strength, heat resistance, high-temperature restoring force and chemical resistance, while being applicable to injection-molding and recyclable, like general thermoplastic resins. Disclosed herein is further a gasket produced from the composition.

20 Claims, 1 Drawing Sheet

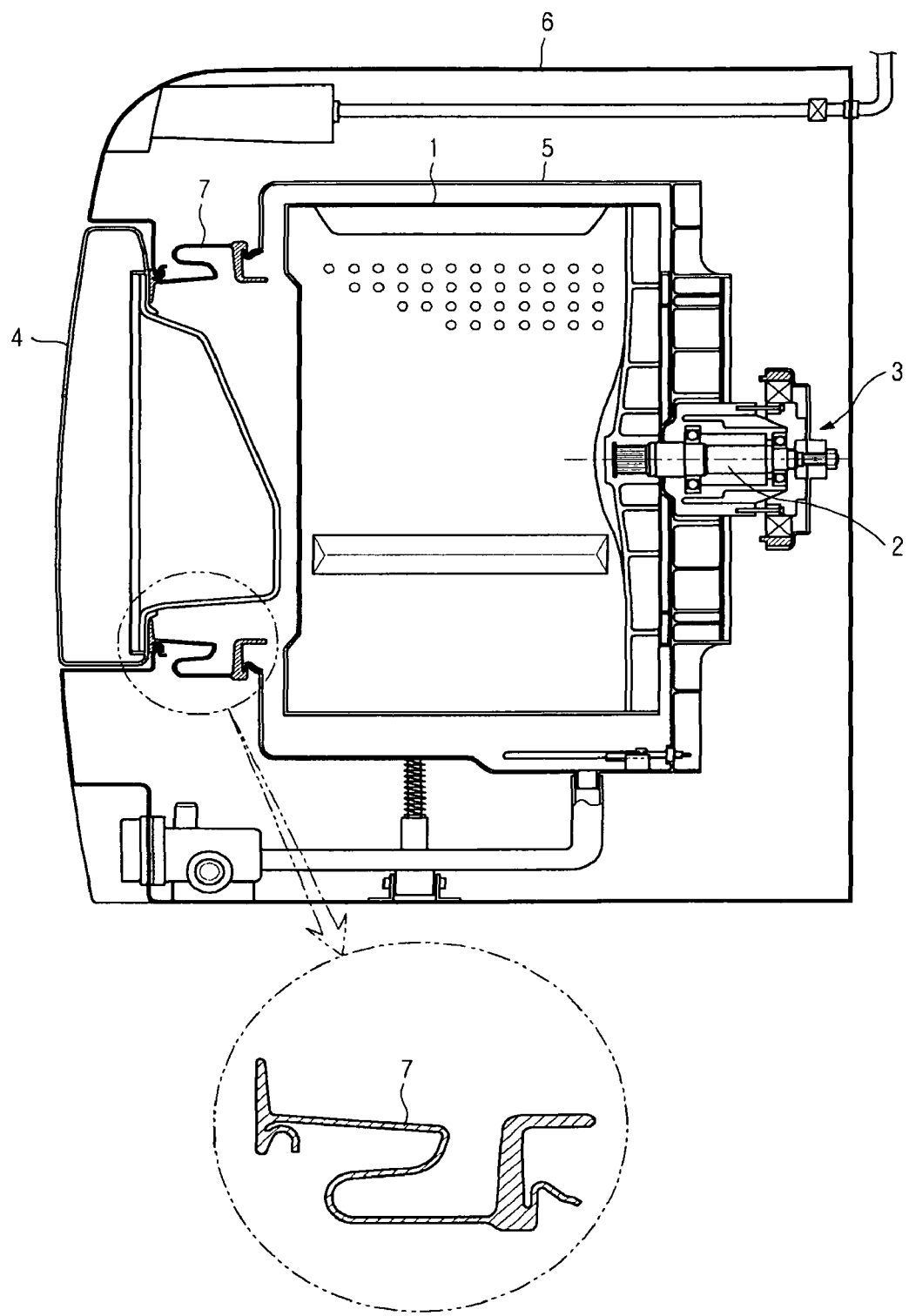

COMPOSITION FOR GASKET AND GASKET

CROSS-REFERENCE TO RELATED APPLICATIONS

This application claims the benefit of Korean Patent Application No. 2008-0046183, filed on May 19, 2008 in the Korean Intellectual Property Office, the disclosure of which is incorporated herein by reference.

BACKGROUND

1. Field

The present invention relates to a composition for a gasket and a gasket produced from the composition. More specifically, the present invention relates to a composition for a gasket capable of preventing leakage of water toward a door upon a washing operation of a drum washing machine, and absorbing vibration of a tub transferred to a cabinet, thus reducing overall vibration of the washing machine, and exhibiting superior heat resistance (high-temperature tensile strength and the capability to restore an original state after exposure to high temperatures), and a gasket produced from the composition.

2. Description of the Related Art

Ethylene propylene rubbers, also called "ethylene propylene diene monomers (EPDMs)" are generally used for door gaskets of drum washing machines. However, in order to satisfy physical properties such as tensile strength, heat resistance, high-temperature restoring force (defined as the capability to restore initial dimensions after exposure to high temperatures) and chemical resistance of ethylene propylene rubbers, the process of molding ethylene propylene rubbers necessarily requires a chemical reaction, so-called "cross-linking". Such a cross-linking reaction allows rubbers to have a three-dimensional network structure required to impart elasticity to the rubbers. Accordingly, although time may vary depending on the size and shape of gasket components, it commonly takes 5 to 10 minutes to complete a series of processes including melting, injecting, cross-linking and releasing, after master batches are supplied, thus disadvantageously lengthening an overall molding time and causing low production efficiency. Furthermore, ethylene propylene rubbers are thermosetting rubbers cross-linked by addition of cross-linking agents, thus disadvantageously making it extremely difficult to recycle defective products obtained in the production process.

Japanese Patent No. 3,373,833 discloses a thermoplastic elastomer composition including a hydrogenated block copolymer, a softener for non-aromatic-based system rubbers and a modified polyolefin-based resin, where the composition exhibits superior adhesion force to low-hardness metal components and can be simply supported and integrated with the metal components by injection-molding the composition on the surface thereof.

Conventional drum washing machines having a boiling function that necessarily requires the capability to restore their original state immediately after they are deformed at high temperatures. However, the high-hardness thermoplastic elastomer disclosed in the afore-mentioned Japanese patent has a disadvantage of insufficient heat resistance.

SUMMARY

Therefore, in an attempt to solve the problems of the related art, it is an object of the embodiment to develop a thermoplastic elastomer composition for a gasket that exhibits superior physical properties such as tensile strength, heat resistance, high-temperature restoring force and chemical resistance, comparable to ethylene propylene rubbers (EPDMs), while being applicable to injection-molding and recyclable, like general thermoplastic resins, and a gasket produced from the composition.

Additional aspects and/or advantages will be set forth in part in the description which follows and, in part, will be apparent from the description, or may be learned by practice of the invention.

The foregoing and/or other aspects are achieved by providing a composition for a gasket, including: about 100 parts by weight of a hydrogenated styrene-based block copolymer; about 70 to 99 parts by weight of a petroleum-based softener; about 10 to 25 parts by weight of a polyolefin-based resin; about 10 to 25 parts by weight of an inorganic filler; and about 10 to 25 parts by weight of a heat-resistant polymer, based on 100 parts by weight of the hydrogenated styrene-based block copolymer.

The hydrogenated styrene-based block copolymer may be one or more selected from styrene-ethylene-butylene-styrene (SEBS), styrene-ethylene-propylene-styrene (SEPS), and styrene-ethylene-ethylene-propylene-styrene (SEEPS).

The heat-resistant polymer may be polyphenylene oxide (PPO), phenylene ether (PPE), modified polyphenylene oxide (PPO), or modified phenylene ether (PPE).

The petroleum-based softener may be a naphthene oil or a paraffin oil.

The polyolefin-based resin may be polypropylene.

In accordance with another aspect of the embodiment, there is a gasket produced from the composition.

The gasket may be a gasket for a drum washing machine door, where the gasket for the drum washing machine door has a hardness (based on KS M 6518) of about 30 to 50.

The foregoing and/or other aspects are achieved by providing a method of forming a gasket of a washing machine, including: blending about 100 parts by weight of a hydrogenated styrene-based block copolymer with about 10 to 25 parts by weight of a heat-resistant polymer; and sequentially mixing about 70 to 99 parts by weight of a petroleum-based softener, about 10 to 25 parts by weight of a polyolefin-based resin and about 10 to 25 parts by weight of an inorganic filler into the blend of the hydrogenated styrene-based block copolymer and the heat-resistant polymer.

BRIEF DESCRIPTION OF THE DRAWINGS

These and/or other aspects and advantages will become apparent and more readily appreciated from the following description of the embodiments, taken in conjunction with the accompanying drawings of which:

FIG. 1 is a cross-sectional view illustrating a general drum washing machine.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

The composition for a gasket according to an aspect of the present embodiments may employ a hydrogenated styrene-based block copolymer. The hydrogenated styrene-based block copolymer may use one or more selected from styreneethylene-butylene-styrene (SEBS), styrene-ethylene-propylene-styrene (SEPS), and styrene-ethylene-ethylene-propylene-styrene (SEEPS).

In addition, the composition for a gasket according to another aspect of the present embodiments further may include a petroleum-based softener to reduce the hardness of the thermoplastic elastomer composition. A naphthene or paraffin oil may be used as the petroleum-based softener. The content of the softener may be about 70 to 99 parts by weight, with respect to 100 parts by weight of the styrene-based block copolymer. When the content of the softener is less than 70 parts by weight, the hardness of the composition cannot be reduced to the desired level, and when the content of the softener exceeds 99 parts by weight, the composition becomes viscose due to oil breeding, thus being readily contaminated and hardening after a long period of time passes and thus being unsuitable for the gasket material.

In addition, the composition for a gasket according to an aspect of the present embodiment further may include polyolefin to improve heat resistance of the thermoplastic elastomer composition. The polyolefin may be one or more selected from linear or non-linear polyethylenes and polypropylenes that have a melt index of 5 to 20 g/min (200° C., 2.16 kg). However, the use of polypropylene results in an improvement in the heat resistance. The content of polyolefin is about 10 to 25 parts by weight, with respect to 100 parts by weight of the styrene-based block copolymer. When the content of the polyolefin is less than 10 parts by weight, heat-resistance of the composition cannot be sufficiently obtained, and when the content of the polyolefin exceeds 25 parts by weight, elasticity of elastomer is deteriorated.

In addition, the composition for a gasket according to an aspect of the present embodiment may further include an inorganic filler, such as calcium carbonate ($CaCO_3$), clay, diatomite, talc, barium sulfate, magnesium carbonate, metal oxide, graphite, and aluminum hydroxide.

In addition, the composition for a gasket according to another embodiment further may include a heat-resistant polymer to improve high-temperature tensile strength and high-temperature elongation variation (the capability to restore initial shape after exposure to high temperatures) of the thermoplastic elastomer. The heat-resistant polymer solves the problem of the drum washing machine gaskets being damaged upon a washing operation. Examples of useful heat-resistant polymers may include polyphenylene oxide (PPO), polyphenylene ether (PPE) and modifications therebetween. The content of the heat-resistant polymer may be about 10 to 25 parts by weight, with respect to 100 parts by weight of the styrene-based block copolymer. If the polymer content is out of the range of about 10 to 25 parts by weight, high-temperature tensile strength and the capability to restore initial shape after heating at high temperatures are significantly deteriorated.

Furthermore, if necessary, the composition for a gasket may further include a variety of additives, reinforcing agents, flame retardants, antimicrobial agents, hindered amine light stabilizers, etc., so long as the object of the present is not impaired.

Methods of preparing the composition for a gasket according to another aspect of the present embodiments may include any method known in the prior art without particular limitation. For example, materials are sequentially melt-mixed with a hot kneader, extruded, and then pelletized with an underwater cut. Then, the pellet is injection-molded into a gasket for a washing machine.

The composition for a gasket according to an aspect of the present embodiments has superior physical properties such as tensile strength, heat resistance, high-temperature restoring force and chemical resistance, comparable to ethylene propylene rubbers (EPDMs), while being applicable to injection-molding and recyclable, like general thermoplastic resins. As a result, gaskets and products formed from the composition are applicable to gaskets for electronics such as drum washing machines, dishwashers, driers and vacuum/steam cleaners, motor vehicles parts, medical supplies, household appliances, office supplies, leisure supplies, living products, etc.

As shown in FIG. 1, a drum washing machine body includes a drum 1 to house washings, a shaft 2 and a driving unit 3 to rotate the shaft 2 and thus the drum 1. In addition, the front surface of the washing machine is provided with a door 4 arranged in a predetermined region where there is an opening of the drum 1, and a gasket 7 interposed between the door 4 and a tub 5 to prevent leakage of water to the door 4 and the tub 5.

The gasket 7 for a drum washing machine door must have additional physical properties to prevent water leakage and transfer of vibration of the tub 5 to a front cabinet 6 upon operation of the washing machine. Thus, the gasket for drum washing machine doors has a hardness (according to KS M 6518) of approximately 30 to 50. When the hardness is less than 30, mechanical strength such as tensile strength is poor, and when the hardness exceeds 50, vibration of the tub 5 may be transferred to the front cabinet 6, thus causing excessive vibration of the washing machine.

Hereinafter, the high-temperature tensile strength and high-temperature restoring force of the composition for a gasket of the present embodiment will be described in further detail with reference to the following examples.

EXAMPLES

Comparative Example 1

100 parts by weight of styrene-ethylene-butylene-styrene (SEBS) as a styrene-based block copolymer was blended with 27 parts by weight of heat-resistant polymer phenylene ether at 200 to 240° C., and 150 parts by weight of a paraffin oil, 15 parts by weight of polypropylene, and 10 parts by weight of calcium carbonate are sequentially mixed with the blend. The final mixture is pelletized by extrusion-molding and then formed into a sample (width 1.27 cm, length 6 cm, thickness 1.8 mm) with an injection machine.

Example 1

100 parts by weight of styrene-ethylene-butylene-styrene (SEBS) as a styrene-based block copolymer was blended with 15 parts by weight of heat-resistant polymer phenylene ether at 200 to 240° C., and 90 parts by weight of a paraffin oil, 12 parts by weight of polypropylene, and 10 parts by weight of calcium carbonate are sequentially mixed with the blend. The final mixture is pelletized by extrusion-molding and then formed into a sample (width 1.27 cm, length 6 cm, thickness 1.8 mm) with an injection machine.

Example 2

100 parts by weight of styrene-ethylene-butylene-styrene (SEBS) as a styrene-based block copolymer was blended with 10 parts by weight of heat-resistant polymer phenylene ether at 200 to 240° C., and 80 parts by weight of a paraffin oil, 15 parts by weight of polypropylene, and 12 parts by weight of calcium carbonate are sequentially mixed with the blend. The final mixture is pelletized by extrusion-molding and then formed into a sample (width 1.27 cm, length 6 cm, thickness 1.8 mm) with an injection machine.

Experimental Example

For the samples of Comparative Example 1 and Examples 1 and 2, hardness and tensile strength testing are carried out according to KS M 6518. The results thus obtained are shown in Table 1 below. In particular, the term "elongation variation" refers to a ratio of an initial length to a final length (in which the final length is obtained at 24 hours after a load of 500 g/cm² is applied at 90° C. to the sample (width 1.27 cm, length 6 cm, thickness 1.8 mm) in a length direction).

TABLE 1

|  | Comp. Ex. 1 | Ex. 1 | Ex. 2 |
| --- | --- | --- | --- |
| Hardness | 41 | 41 | 42 |
| Ambient-temperature tensile strength (kgf/cm², 25° C.) | 55 | 68 | 71 |
| High-temperature tensile strength (kgf/cm², 90° C.) | 9 | 21 | 20 |
| High-temperature elongation variation (%) | 7.1 | 1.4 | 1.5 |

As can be seen from Table 1 above, the sample of the present embodiment exhibited improved high-temperature tensile strength as well as significantly low high-temperature elongation variation, as compared to the sample of Comparative Example 1.

Accordingly, the composition for a gasket according to the present embodiment can overcome the problem in which gaskets are deformed upon exposure to high temperatures.

As apparent from the foregoing, the prevent embodiment provides a thermoplastic elastomer composition that has superior physical properties, such as tensile strength, heat resistance, high-temperature restoring force and chemical resistance, while being applicable to injection-molding and recyclable, like general thermoplastic resins, and a gasket produced from the composition.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
a body;
a tub provided in the body;
a drum provided in the tub, the drum being rotatable and being provided with an opening for receiving laundry;
a door provided at a front of the body; and
a gasket including a first annular section configured to engage with a rim of the tub, a second annular section configured to engage with the body and a vibration absorbing section disposed between the first annular section and the second annular section to reduce transfer of vibration from the tub to the front of the body,
wherein the gasket is manufactured by a plastic injection molding process using a plastic mold, the plastic injection molding process using plastic as a base material mixed with additives such that the manufactured gasket has a hardness of 30 to 50 in accordance with KS M 6518.

2. The washing machine according to claim 1, wherein the plastic material for gaskets is composed of a block copolymer having a molecular structure which exhibits elasticity and plasticity depending on temperature.

3. The washing machine according to claim 2, wherein the gasket composition comprises:
a first additive containing a softener mixed with the block copolymer to reduce hardness of the gasket;
a second additive containing a polyolefin resin mixed with the block copolymer to improve heat resistance of the gasket;
a third additive containing a filler mixed with the block copolymer to improve specific gravity of the gasket; and
a fourth additive containing a heat-resistant polymer mixed with the block copolymer to improve high-temperature tensile strength and high-temperature stabililty of the gasket.

4. The washing machine according to claim 3, wherein the block copolymer comprises a hydrogenated styrene-based block copolymer.

5. The washing machine according to claim 4, wherein the hydrogenated styrene-based block copolymer is selected from styrene-ethylene-butylene-styrene (SEBS), styrene-ethylene-propylene-styrene (SEPS), styrene-ethylene-ethylene-propylene-styrene (SEEPS) and combinations thereof.

6. The washing machine according to claim 4, wherein the composition comprises:
70 to 99 parts by weight of the softener;
10 to 25 parts by weight of the polyolefin resin;
10 to 25 parts by weight of the filler; and
10 to 25 parts by weight of the heat-resistant polymer, based on 100 parts by weight of the hydrogenated styrene-based block copolymer.

7. The washing machine according to claim 3, wherein the softener comprises a naphtha oil or a paraffin oil.

8. The washing machine according to claim 3, wherein the polyolefin resin comprises polyethylene, polypropylene or a combination thereof.

9. The washing machine according to claim 1, wherein the plastic material comprises block copolymer.

10. The washing machine according to claim 1, wherein the additives comprise softener.

11. The washing machine according to claim 9, wherein the additives comprise softener.

12. The washing machine according to claim 10, wherein the softener comprises naphtha oil.

13. The washing machine according to claim 10, wherein the softener comprises paraffin oil.

14. The washing machine according to claim 11, wherein the softener comprises naphtha oil.

15. The washing machine according to claim 11, wherein the softener comprises paraffin oil.

16. The washing machine according to claim 10, wherein the additives further comprises polyolefin resin, filler and heat-resistant polymer.

17. The washing machine according to claim 16, wherein the plastic material comprises block copolymer.

18. The washing machine according to claim 17, wherein a composition of the gasket comprises:
70 to 99 parts by weight of the softener;
10 to 25 parts by weight of the polyolefin resin;
10 to 25 parts by weight of the filler; and
10 to 25 parts by weight of the heat-resistant polymer, based on 100 parts by weight of the block copolymer.

19. The washing machine according to claim 16, wherein the polyolefin resin comprises polyethylene, polypropylene or a combination thereof.

20. The washing machine according to claim 9, wherein the plastic material comprises hydrogenated styrene-based block copolymer.

* * * * *

UNITED STATES PATENT AND TRADEMARK OFFICE
CERTIFICATE OF CORRECTION

PATENT NO. : 8,262,092 B2  
APPLICATION NO. : 12/385412  
DATED : September 11, 2012  
INVENTOR(S) : Young Deog Koh et al.

Page 1 of 1

It is certified that error appears in the above-identified patent and that said Letters Patent is hereby corrected as shown below:

In the Claims:

Column 6, Line 12 (Approx.), In Claim 3, delete "stabililty" and insert --stability--, therefor.

Signed and Sealed this  
Twenty-first Day of May, 2013

Teresa Stanek Rea  
*Acting Director of the United States Patent and Trademark Office*